United States Patent
Chen

(10) Patent No.: US 9,681,470 B2
(45) Date of Patent: Jun. 13, 2017

(54) MATCHING METHOD AND MATCHING SYSTEM BETWEEN WEARABLE SMART DEVICE AND TERMINAL

(71) Applicants: Inventec Appliances (Pudong) Corporation, Shanghai (CN); Inventec Appliances Corp., New Taipei (TW)

(72) Inventor: Shih-Ho Chen, New Taipei (TW)

(73) Assignees: Inventec Appliances (Pudong) Corporation, Shanghai (CN); Inventec Appliances Corp., New Taipei (TW)

( * ) Notice: Subject to any disclaimer, the term of this patent is extended or adjusted under 35 U.S.C. 154(b) by 150 days.

(21) Appl. No.: 14/572,747

(22) Filed: Dec. 16, 2014

(65) Prior Publication Data

US 2015/0312946 A1    Oct. 29, 2015

(30) Foreign Application Priority Data

Apr. 24, 2014   (CN) .......................... 2014 1 0167901

(51) Int. Cl.
| | | |
|---|---|---|
| *H04W 72/00* | (2009.01) | |
| *H04W 76/02* | (2009.01) | |
| *H04W 84/18* | (2009.01) | |

(52) U.S. Cl.
CPC ............ *H04W 76/02* (2013.01); *H04W 84/18* (2013.01)

(58) Field of Classification Search
CPC ....... H04W 4/02; H04W 4/023; H04W 4/021; H04W 84/12; H04W 88/02

USPC .......................... 455/450, 456.1, 456.2, 566
See application file for complete search history.

(56) References Cited

U.S. PATENT DOCUMENTS

| | | | | |
|---|---|---|---|---|
| 2015/0148623 | A1* | 5/2015 | Benaron | A61B 5/0059 600/306 |
| 2015/0277557 | A1* | 10/2015 | Raffa | G06F 3/014 345/156 |
| 2015/0296480 | A1* | 10/2015 | Kinsey | H04W 4/008 455/41.3 |
| 2015/0332004 | A1* | 11/2015 | Najafi | G06F 19/345 706/46 |
| 2015/0378391 | A1* | 12/2015 | Huitema | G06F 1/163 361/679.03 |
| 2016/0029929 | A1* | 2/2016 | Worthen | A61B 5/1116 600/595 |

* cited by examiner

*Primary Examiner* — Joseph Arevalo
(74) *Attorney, Agent, or Firm* — CKC & Partners Co., Ltd.

(57) ABSTRACT

A matching method between a wearable smart device and a terminal is disclosed, in which the wearable smart device is disposed with a plurality of LEDs. The matching method includes: the terminal triggering the designated wearable smart device to generate an emitting status for each of the LEDs; and the terminal displaying an interactive interface for a user to input the emitting status of each of the LEDs, in which when the emitting status of each of the LEDs inputted by the user is the same as the emitting status of each of the LEDs triggered by the terminal, a communication connection is established between the terminal and the designated wearable smart device. A matching system is disclosed herein as well.

18 Claims, 6 Drawing Sheets

US 9,681,470 B2

MATCHING METHOD AND MATCHING SYSTEM BETWEEN WEARABLE SMART DEVICE AND TERMINAL

RELATED APPLICATIONS

This application claims priority to Chinese Application Serial Number 201410167901.X, filed Apr. 24, 2014, the entirety of which is herein incorporated by reference.

BACKGROUND

Technical Field

The present disclosure relates to wireless communication. More particularly, the present disclosure relates to a matching method and a matching system between a wearable smart device and a terminal.

Description of Related Art

As the downsizing and the development of smart devices, wearable smart devices are produced as new applications. For example, a smart bracelet integrates various sensing technology and wireless communication techniques. A smart bracelet is capable of collecting human data such as sporting, sleeping, heart rate, blood pressure and body temperature by utilizing different sensors, and connecting other terminals wirelessly (e.g., a mobile phone, a tablet computer, a Personal Digital Assistant (PDA), a personal computer (PC) and cloud server) such that the collected data is transmitted to and stored in the terminals.

In order to establish the communication connection between the wearable smart device and the terminal, the user has to match (or pair) the wearable smart device and the terminal. In the matching process of current wireless communication technique, for example, the matching utilizing Bluetooth Low Energy (BLE) technique, the initiator normally detects surrounding Bluetooth devices first, and transmits a matching request to a user-designated responding device. The user returns a responding message from the responding device according to pre-defined matching rules. The initiator then verifies the responding message according to the matching rules. The matching process is completed, and a connection between the initiator and the responding device is established if the verification is successful. In order to reduce power consumption, most wearable smart devices are not equipped with a display unit and a input unit. Therefore, conventional matching methods are improved. Typically, in performing the matching between a smart bracelet and a mobile device, after the mobile phone transmits a connection request to the smart bracelet, the user can clap on the smart bracelet. The vibration sensor of the smart bracelet collects data of clapping, generates a corresponding electronic signal as response information for the mobile phone. Consequently, the mobile phone verifies the electronic signal according to the pre-defined matching rules, and the matching process is completed. However, due to the different time interval of the user clapping, the electronic signals generated accordingly are different, which may result in higher chances of matching failure.

SUMMARY

In one aspect, the present disclosure is related to a matching method between a wearable smart device and a terminal, in which the wearable smart device is disposed with a plurality of LEDs. The matching method includes: the terminal triggering the designated wearable smart device to generate an emitting status for each of the LEDs; and the terminal displaying an interactive interface for a user to input the emitting status of each of the LEDs, in which when the emitting status of each of the LEDs inputted by the user is the same as the emitting status of each of the LEDs triggered by the terminal, a communication connection is established between the terminal and the designated wearable smart device.

In another aspect, the present disclosure is related to a matching system between a wearable smart device and a terminal. The matching system includes a wearable smart device and a terminal. The wearable smart device is disposed with a plurality of LEDs, configured for generating an emitting status for each of the LEDs after being triggered by the terminal. The terminal is configured for triggering the wearable smart device to generate the emitting status for each of the LEDs, and for displaying an interactive interface for a user to input the emitting status of each of the LEDs, in which when the emitting status of each of the LEDs inputted by the user is the same as the emitting status of each of the LEDs triggered by the terminal, a communication connection is established between the terminal and the designated wearable smart device.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
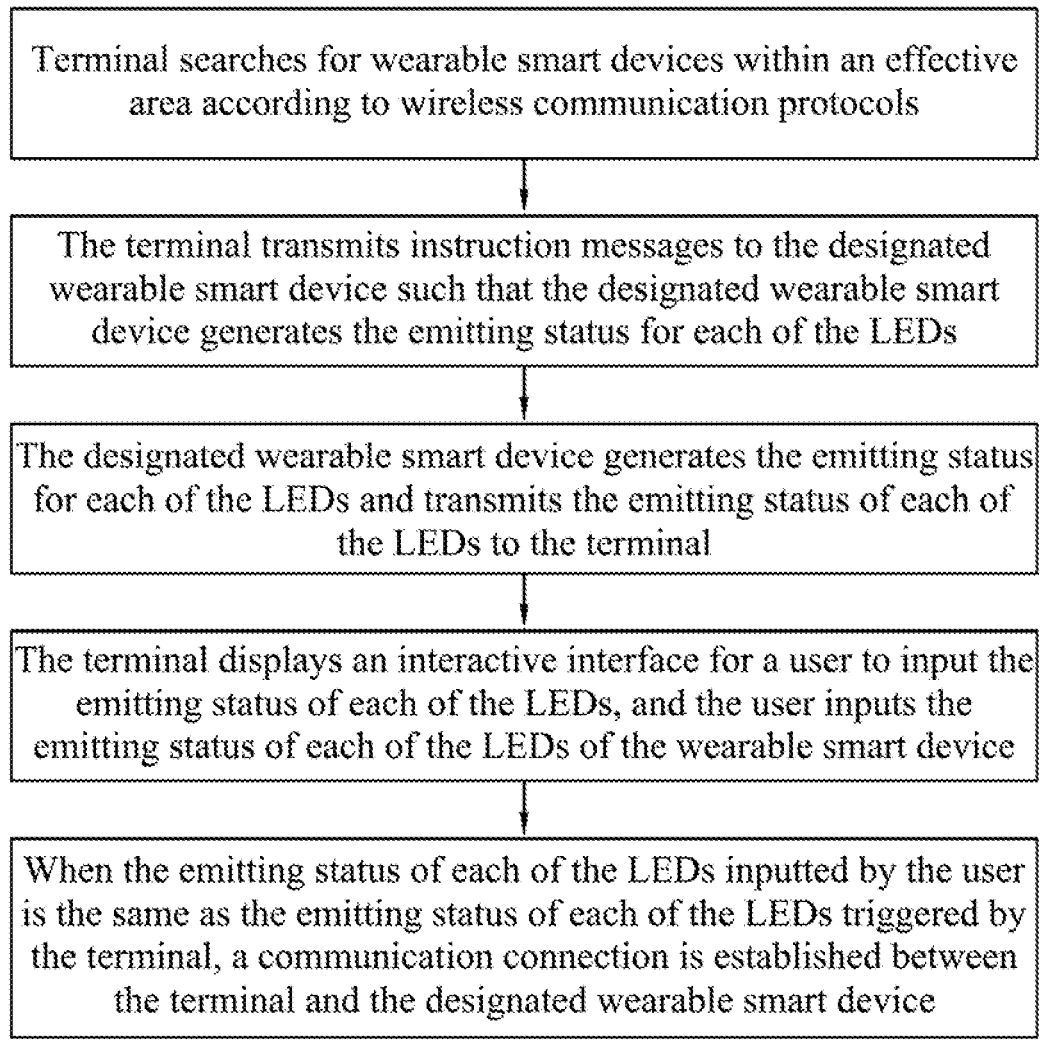
FIG. 1 is a flow chart of a matching method in accordance with one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

The present invention discloses matching method between a wearable smart device and a terminal, in which the wearable smart device is disposed with a plurality of LEDs. The matching method includes: the terminal triggering the designated wearable smart device to generate an emitting status for each of the LEDs; the terminal displaying an interactive interface for a user to input the emitting status of each of the LEDs, in which when the emitting status of each of the LEDs inputted by the user is the same as the emitting status of each of the LEDs triggered by the terminal, a communication connection is established between the terminal and the designated wearable smart device.

Based on the abovementioned techniques, the following embodiments are presented to explain the invention.

Embodiment 1

Reference is made first to FIG. 1. FIG. 1 is a flow chart of a matching method in accordance with one embodiment of the present disclosure. As illustrated in FIG. 1, in this embodiment, the matching method between a wearable smart device and a terminal includes the following steps: the terminal searching for wearable smart devices within an effective area according to wireless communication protocols; the terminal transmitting instruction messages to the designated wearable smart device such that the designated wearable smart device generates the emitting status for each of the LEDs; and the designated wearable smart device generating the emitting status for each of the LEDs and transmitting the emitting status of each of the LEDs to the terminal. According to one embodiment of the present disclosure, the designated wearable smart device generates the emitting status of each of the LEDs randomly, and the terminal displays the interactive interface for the user to input the emitting status of each of the LEDs such that the user could input the emitting status of each of the LEDs of the current wearable smart device. The terminal compares the emitting status of each of the LEDs inputted by the user with the received emitting status of each of the LEDs to determine if the emitting statuses are the same. When the emitting status of each of the LEDs inputted by the user is the same as the emitting status of each of the LEDs triggered by the terminal, a communication connection is established between the terminal and the designated wearable smart device.

Figure 2:
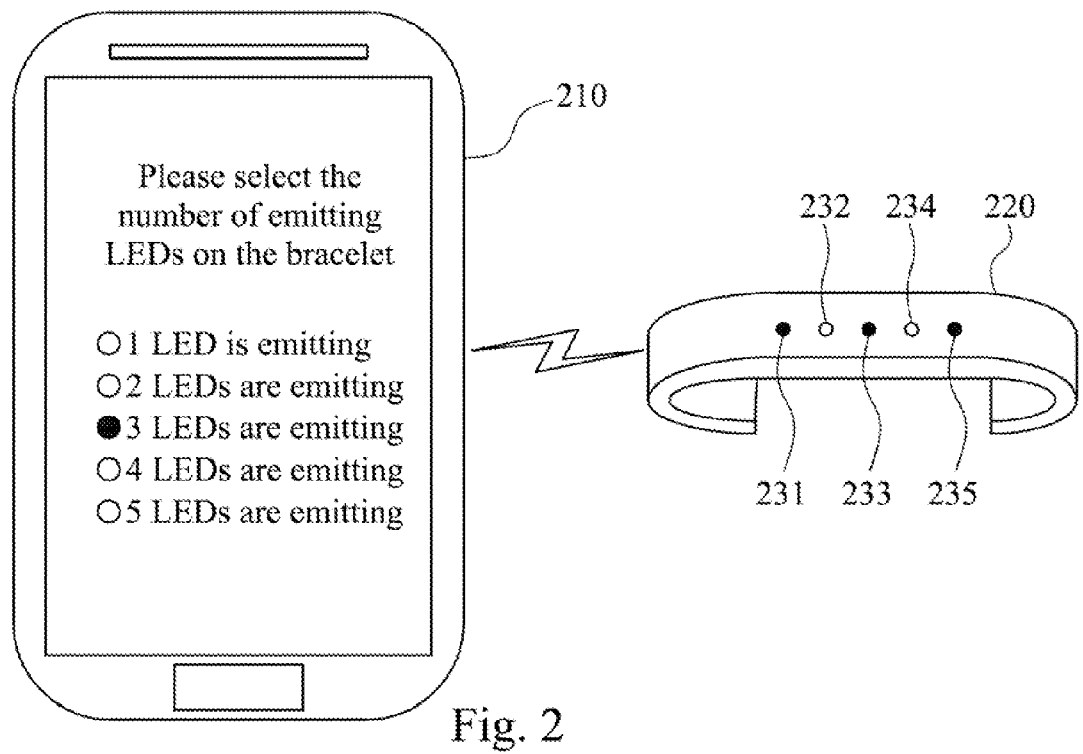
FIG. 2 is schematic diagram of an application in accordance with one embodiment of the present disclosure.

In this embodiment, the terminal can be, but not limited to, a mobile phone, a tablet computer, a PDA, a PC or a cloud server. The wearable smart device can be a device which could be connected with the terminal wirelessly, such as a smart bracelet, a bluetooth headset or a bluetooth sound system. The terminal could trigger the designated wearable smart device to generate an emitting status corresponding to the number of LEDs. The emitting status can indicate the number of emitting LEDs and/or non-emitting LEDs. Reference is made also to FIG. 2. FIG. 2 is a schematic diagram of an application in accordance with one embodiment of the present disclosure. As shown in FIG. 2, a mobile phone 210 triggers a smart bracelet 220 to generate an emitting status with three emitting LEDs 231, 233 and 235 and two non-emitting LEDs 232 and 234. The mobile phone 210 displays the interactive interface for the user to input the number of emitting LEDs. When the number of emitting LEDs inputted by the user is 3, a communication connection is established between the mobile phone 210 and the smart bracelet 220.

Figure 3:
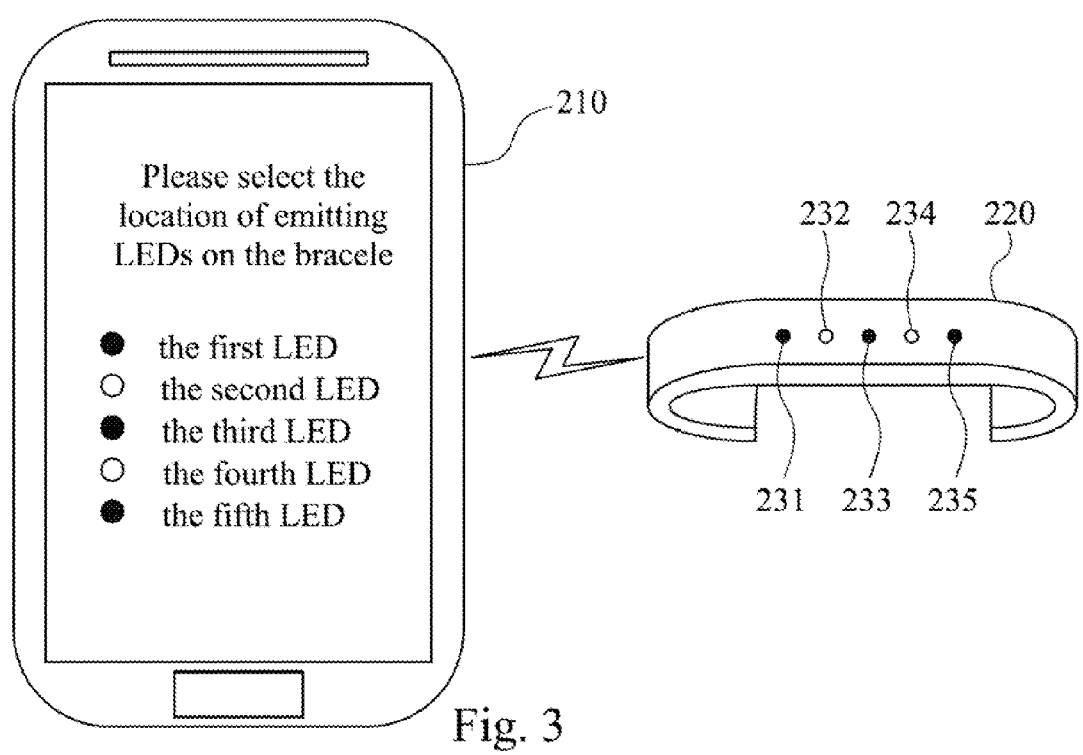
FIG. 3 is schematic diagram of an application in accordance with one embodiment of the present disclosure.

According to another embodiment of the present disclosure, the emitting status can indicate the locations of emitting LEDs and/or non-emitting LEDs. Additional reference is made to FIG. 3. FIG. 3 is a schematic diagram of an application in accordance with one embodiment of the present disclosure. As shown in FIG. 3, first, the locations of the 5 LEDS 231, 232, 233, 234 and 235 on the smart bracelet 220 are defined. For example, the 5 LEDS 231, 232, 233, 234 and 235 can be numbered, or apply other techniques used by persons skilled in the art to define the locations of the 5 LEDS 231, 232, 233, 234 and 235. In FIG. 3, the LEDs 231, 232, 233, 234 and 235 on the smart bracelet 220 are numbered as 1-5 from left to right. The mobile phone 210 triggers the smart bracelet 220 to generate an emitting status with LEDs number 1, number 3 and number 5 (i.e., LEDs 231, 233 and 235) emitting. Accordingly, the mobile phone 210 displays the interactive interface for the user to input the locations of emitting LEDs. When the locations of emitting LEDs inputted by the user are LEDs number 1, number 3 and number 5, a communication connection is established between the mobile phone 210 and the smart bracelet 220.

According to still another embodiment of the present disclosure, the terminal triggers the designated wearable smart device to generate multiple sets of emitting statuses of LEDs, in which each set of the emitting statuses of LEDs corresponds to the number of LEDs. The multiple sets of emitting statuses of LEDs are generated according to chronological order, in which each set of the emitting statuses of LEDs indicates the number of emitting LEDs and/or non-emitting LEDs, and/or the locations of emitting LEDs and/or non-emitting LEDs.

Figure 4A:
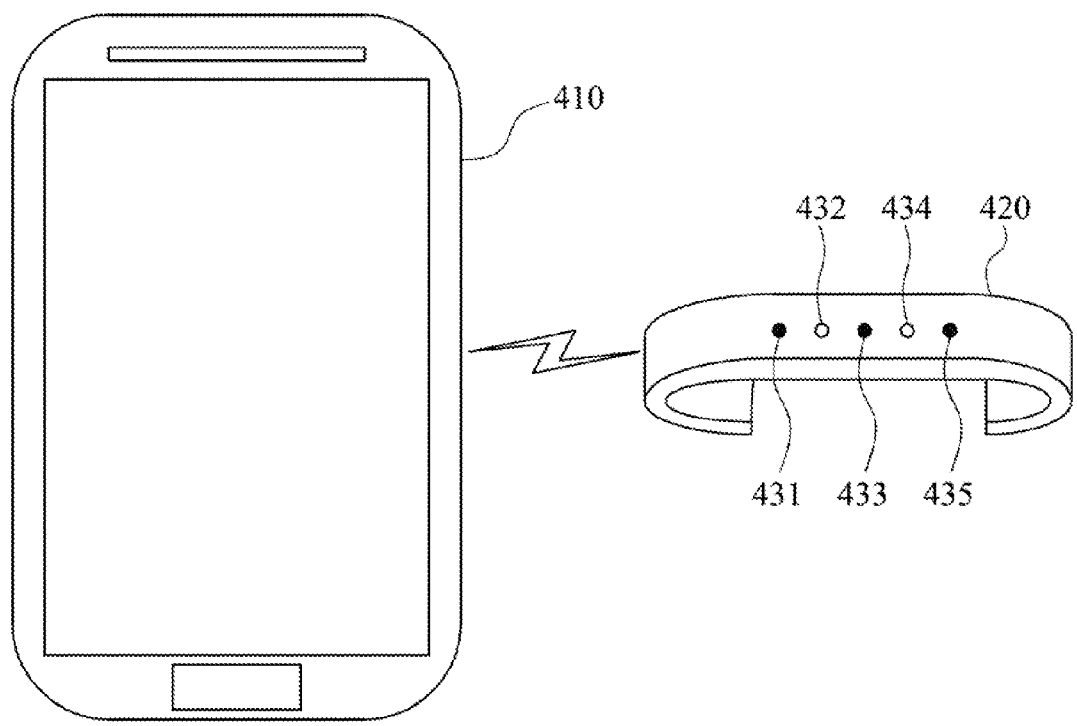
FIG. 4a is schematic diagram of an application in accordance with one embodiment of the present disclosure.
Figure 4B:
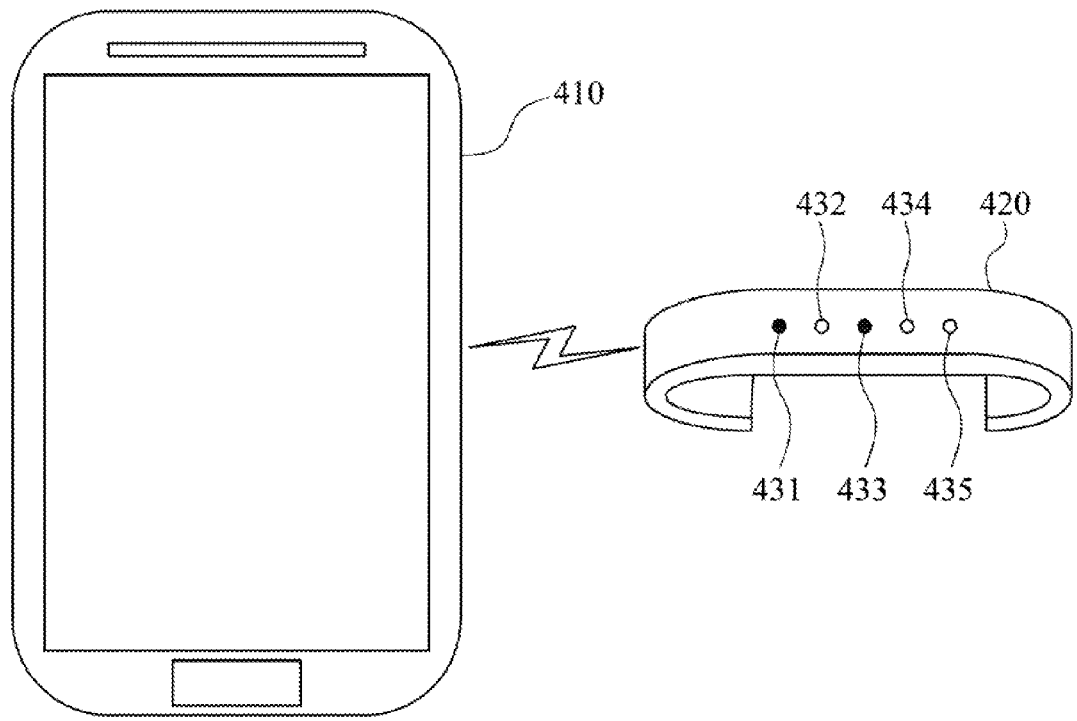
FIG. 4b is schematic diagram of an application in accordance with one embodiment of the present disclosure.
Figure 4C:
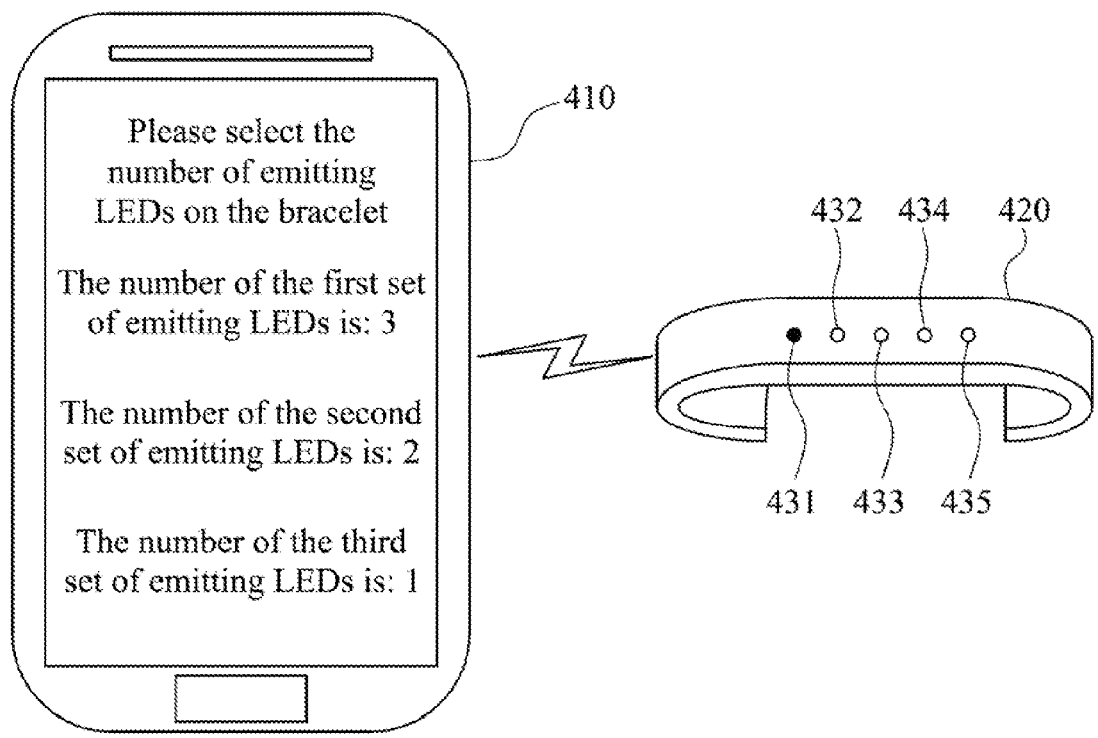
FIG. 4c is schematic diagram of an application in accordance with one embodiment of the present disclosure.

Reference is now made to FIG. 4a-FIG. 4c. FIG. 4a-FIG. 4c are schematic diagrams illustrating an application in accordance with one embodiment of the present disclosure, in which a mobile phone 410 triggers a smart bracelet 420 to generate three sets of emitting statuses of LEDs 431, 432, 433, 434 and 435.

As shown in FIG. 4a, in a first instance, a first emitting status of LEDs is generated with three emitting LEDs (i.e., LEDs 431, 433 and 435) and two non-emitting LEDs (i.e., LEDs 432 and 434). As shown in FIG. 4b, in a second instance, a second emitting status of LEDs is generated with two emitting LEDs (i.e., LEDs 431 and 433) and three non-emitting LEDs (i.e., LEDs 432, 434 and 435). As shown in FIG. 4c, in a third instance, a third emitting status of LEDs is generated with one emitting LEDs (i.e., LED 431) and four non-emitting LEDs (i.e., LEDs 432, 433, 434 and 435). The mobile phone 410 displays the interactive interface for the user to input the number of emitting LEDs for the three sets of emitting statuses. When the number of emitting LEDs for the three sets of emitting statuses inputted by the user are 3 for the first set, 2 for the second set and 1 for the third set, a communication connection is established between the mobile phone 410 and the smart bracelet 420.

Figure 4D:
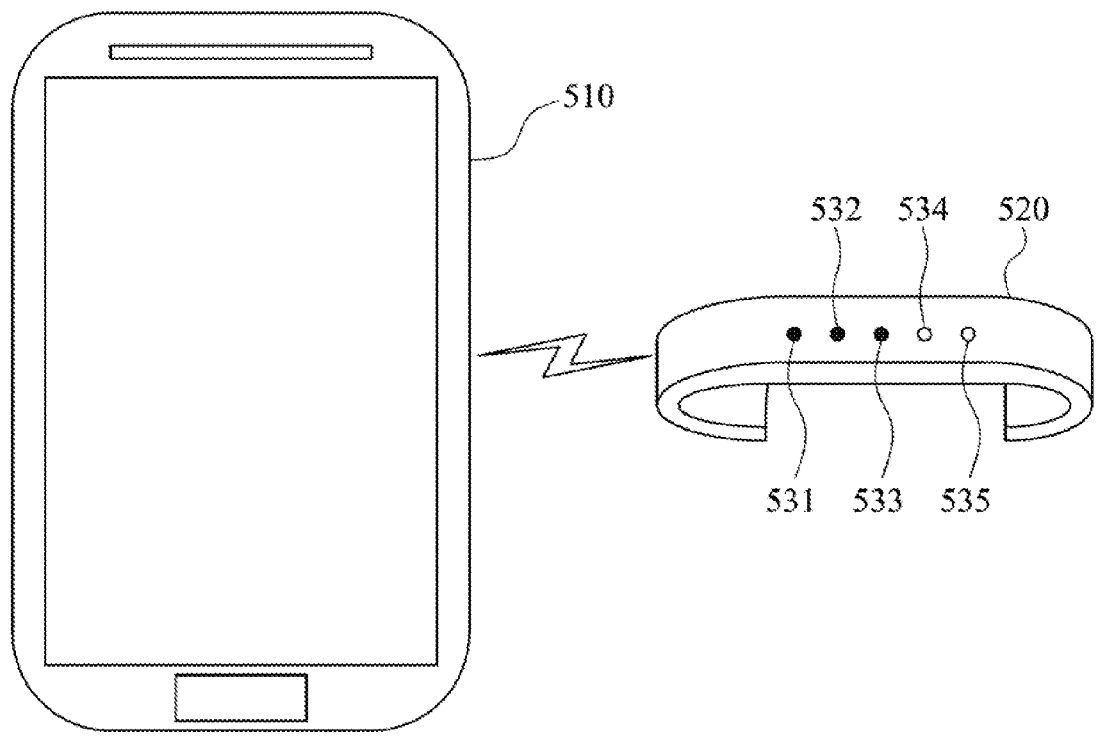
FIG. 4d is schematic diagram of an application in accordance with one embodiment of the present disclosure.
Figure 4E:
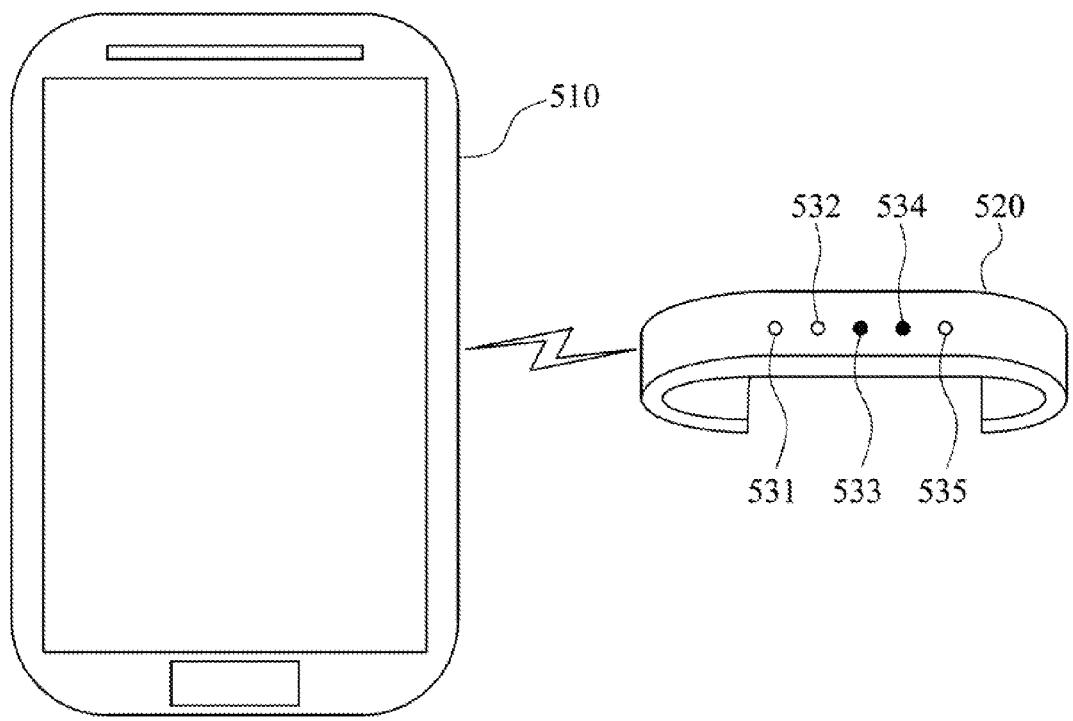
FIG. 4e is schematic diagram of an application in accordance with one embodiment of the present disclosure.
Figure 4F:
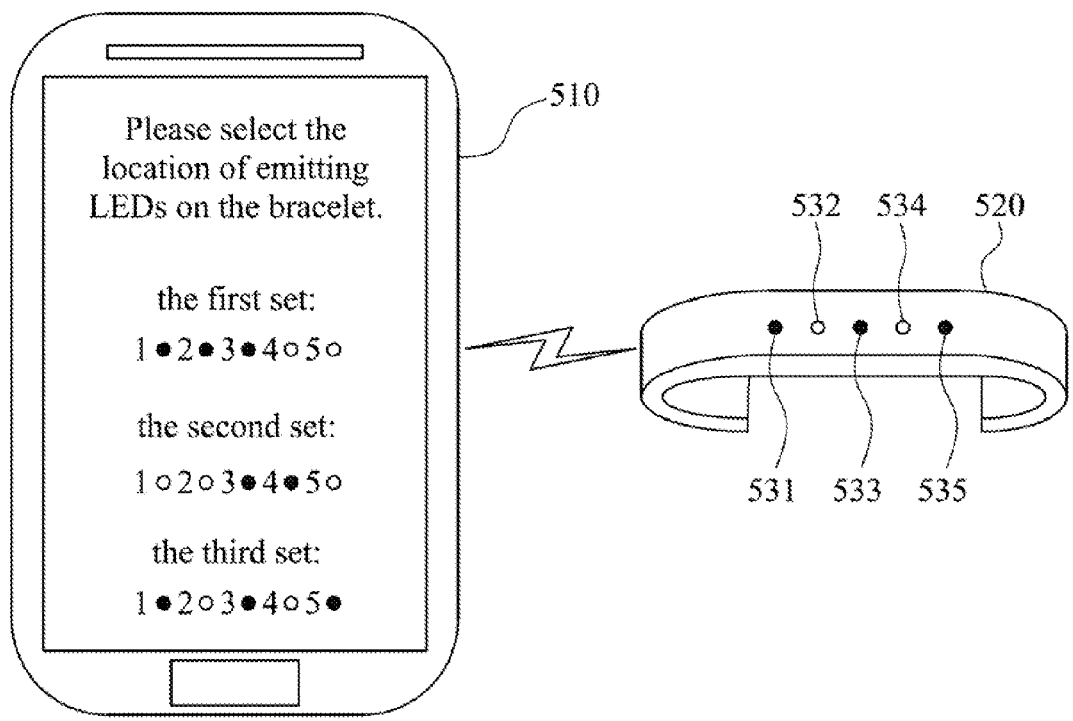
FIG. 4f is schematic diagram of an application in accordance with one embodiment of the present disclosure.

Reference is further made to FIG. 4d-FIG. 4f. FIG. 4d-FIG. 4f are schematic diagrams illustrating an application in accordance with one embodiment of the present disclosure, in which a mobile phone 510 triggers a smart bracelet 520 to generate three sets of emitting statuses of LEDs 531, 532, 533, 534 and 535 corresponding to the locations of emitting LEDs and/or non-emitting LEDs. First, the locations of the 5 LEDS on the smart bracelet 520 are defined. In FIG. 4d-FIG. 4f, the LEDs on the smart bracelet 520 are numbered as 1-5 from left to right. As shown in FIG. 4d, in a first instance, a first emitting status of LEDs is generated with LEDs number 1, number 2 and number 3 (i.e., LEDs 531, 532 and 533) emitting. As shown in FIG. 4e, in a second instance, a second emitting status of LEDs is generated with LEDs number 3 and number 4 (i.e. LEDs 533 and 534) emitting. As shown in FIG. 4f, in a third instance, a third emitting status of LEDs is generated with LEDs number 1, number 3 and number 5 (i.e., LEDs 531, 533 and 535) emitting. Accordingly, the mobile phone 510 displays the interactive interface for the user to input the locations of emitting LEDs for the three sets of emitting statuses. When the locations of emitting LEDs for the three sets of emitting statuses inputted by the user are LEDs number 1, number 2 and number 3 for the first set, LEDs number 3 and number 4 for the second set, and LEDs number 1, number 3 and number 5 for the third set, a communication connection is established between the mobile phone 510 and the smart bracelet 520.

Embodiment 2

Figure 5:
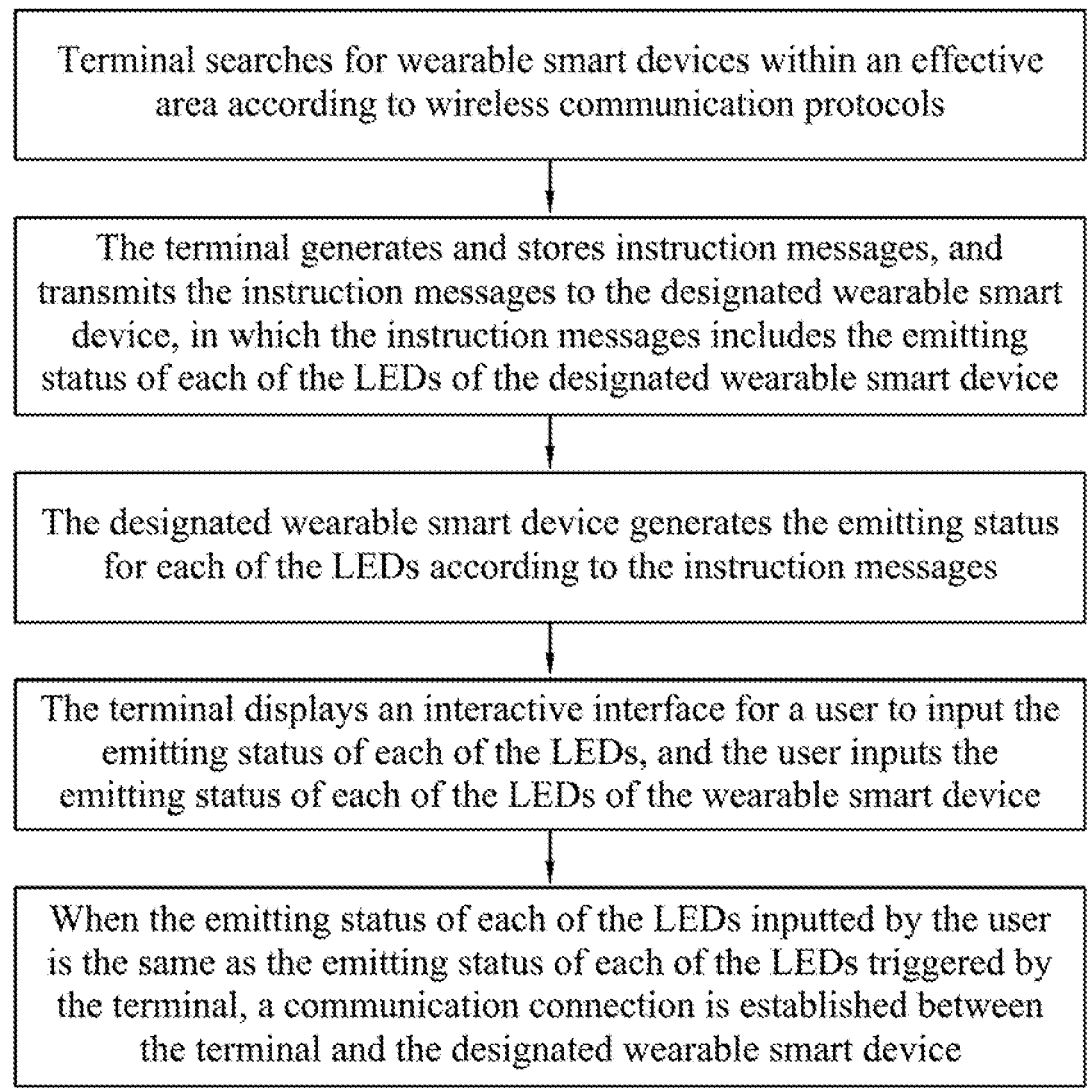
FIG. 5 is a flow chart of a matching method in accordance with one embodiment of the present disclosure.

Reference is now made to FIG. 5. FIG. 5 is a flow chart of a matching method in accordance with one embodiment of the present disclosure. As illustrated in FIG. 5, in this embodiment, the matching method between a wearable smart device and a terminal includes the following steps: the terminal searching for wearable smart devices within an effective area according to wireless communication protocols; the terminal generating and storing instruction messages, and transmitting the instruction messages to the designated wearable smart device, in which the instruction messages include the emitting status of each of the LEDs of the designated wearable smart device; preferably, the designated wearable smart device generating the emitting status of each of the LEDs randomly; the designated wearable smart device generating the emitting status for each of the LEDs according to the instruction messages; the terminal displaying an interactive interface for the user to input the emitting status of each of the LEDs, and the terminal comparing the emitting status of each of the LEDs inputted by the user with the stored emitting status of each of the LEDs to determine if the emitting statuses are the same; and when the emitting status of each of the LEDs inputted by the user is the same as the emitting status of each of the LEDs triggered by the terminal, a communication connection is established between the terminal and the designated wearable smart device.

Similar to embodiment 1, in embodiment 2, the terminal can be, but not limited to, a mobile phone, a tablet computer, a PDA, a PC or a cloud server. The wearable smart device can be a device which could be connected with the terminal wirelessly, such as a smart bracelet, a bluetooth headset or a bluetooth sound system. Furthermore, in embodiment 2, the terminal could either trigger the designated wearable smart device to generate an emitting status corresponding to the number of LEDs, or trigger the designated wearable smart device to generate multiple sets of emitting statuses of LEDs, in which each set of the emitting statuses of LEDs corresponds to the number of LEDs. The multiple sets of emitting statuses of LEDs are generated according to chronological order, in which each set of the emitting statuses of LEDs indicates the number of emitting LEDs and/or non-emitting LEDs, and/or the locations of emitting LEDs and/or non-emitting LEDs. Embodiment 1, FIG. 2, FIG. 3 and FIG. 4a-FIG. 4c provide different applications for reference and the details are not described again herein.

A matching system between a wearable smart device and a terminal is also disclosed in the present invention. The matching system includes a wearable smart device and a terminal; the wearable smart device is disposed with a plurality of LEDs, configured for generating an emitting status for each of the LEDs after being triggered by the terminal; the terminal is configured for triggering the wearable smart device to generate the emitting status for each of the LEDs, and for displaying an interactive interface for a user to input the emitting status of each of the LEDs, in which when the emitting status of each of the LEDs inputted by the user is the same as the emitting status of each of the LEDs triggered by the terminal, a communication connection is established between the terminal and the designated wearable smart device.

Accordingly, the terminal includes a first module configured for searching for wearable smart devices within an effective area according to wireless communication protocols; a second module configured for transmitting instruction messages to the designated wearable smart device such that the designated wearable smart device generates the emitting status for each of the LEDs; and the wearable smart device includes a third module configured for generating the emitting status for each of the LEDs, and transmitting the emitting status of each of the LEDs to the terminal.

Furthermore, the third module of the wearable smart device is configured for generating the emitting status for each of the LEDs randomly, and transmitting the emitting status of each of the LEDs to the terminal.

Moreover, the terminal further includes a fourth module configured for comparing the emitting status of each of the LEDs inputted by the user with the received emitting status of each of the LEDs to determine if the emitting statuses are the same.

Accordingly, the terminal includes a fifth module configured for searching for wearable smart devices within an effective area according to wireless communication protocols, and a sixth module configured for generating and storing instruction messages, and for transmitting the instruction messages to the designated wearable smart device, in which the instruction messages include the emitting status of each of the LEDs of the designated wearable smart device; the designated wearable smart device includes a seventh module configured for generating the emitting status for each of the LEDs according to the instruction messages.

Furthermore, the terminal includes a eighth module configured for comparing the emitting status of each of the LEDs inputted by the user with the stored emitting status of each of the LEDs to determine if the emitting statuses are the same.

Accordingly, the terminal is configured for triggering the designated wearable smart device to generate an emitting status corresponding to the number of LEDs, in which the emitting status is the number of emitting LEDs and/or non-emitting LEDs, and/or the locations of emitting LEDs and/or non-emitting LEDs.

Accordingly, the terminal is configured for triggering the designated wearable smart device to generate multiple sets of emitting statuses of LEDs, in which each set of the emitting statuses of LEDs corresponds to the number of LEDs, and the multiple sets of emitting statuses of LEDs are generated according to chronological order. Each set of the emitting statuses of LEDs is the number of emitting LEDs and/or non-emitting LEDs, and/or the locations of emitting LEDs and/or non-emitting LEDs.

Accordingly, the communication connection established between the terminal and the wearable smart device is a blue-tooth connection.

It has to be explained that the modules performing various functions in the wearable smart device and the terminal can be realized as virtual devices implemented by computer programs. Furthermore, each module could perform multiple operations respectively, and corresponding sub-modules can be included in each module. For simplicity, these sub-modules are not described herein. Persons skilled in the art could utilize computer programs to realize various operations to implement such as triggering, displaying and comparing. The details are not described herein.

By applying the disclosed matching method and matching system between a wearable smart device and a terminal, the emitting statuses of the LEDs disposed on the wearable smart device are utilized to be the verification messages when matching. Moreover, the terminal displays an interactive interface for the user to input the emitting status of each of the LEDs. When the emitting status of each of the LEDs inputted by the user is the same as the emitting status of each of the LEDs triggered by the terminal, a communication connection is established between the terminal and the designated wearable smart device. Consequently, the matching between the wearable smart device and the terminal can be accomplished in a simple, accurate and safe way. The chances of successful matchings are hence raised.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A matching method between a wearable smart device and a terminal, wherein the wearable smart device is disposed with a plurality of LEDs, the matching method comprising:
   the terminal triggering the designated wearable smart device to generate an emitting status for each of the LEDs; and
   the terminal displaying an interactive interface for a user to input the emitting status of each of the LEDs, wherein when the emitting status of each of the LEDs inputted by the user is the same as the emitting status of each of the LEDs triggered by the terminal, a communication connection is established between the terminal and the designated wearable smart device,
   wherein the terminal triggering the designated wearable smart device to generate the emitting status for each of the LEDs comprises the terminal triggering the designated wearable, smart device to generate multiple sets of emitting statuses of LEDs, wherein each set of the emitting statuses of LEDs corresponds to the number of LEDs, and the multiple sets of emitting statuses of LEDs are generated according to chronological order, wherein each set of the emitting statuses of LEDs indicates the number of emitting LEDs and/or non-emitting LEDs, and/or the locations of emitting LEDs and/or non-emitting LEDs.

2. The method of claim 1, wherein the terminal triggering the wearable smart device to generate an emitting status for each of the LEDs further comprising:
   the terminal searching for wearable smart devices according to wireless communication protocols;
   the terminal transmitting instruction messages to the designated wearable smart device such that the designated wearable smart device generates the emitting status for each of the LEDs; and
   the designated wearable smart device generating the emitting status for each of the LEDs and transmitting the emitting status of each of the LEDs to the terminal.

3. The method of claim 2, wherein the designated wearable smart device generating the emitting status of each of the LEDs randomly and transmitting the emitting status of each of the LEDs to the terminal.

4. The method of claim 3, wherein the terminal comparing the emitting status of each of the LEDs inputted by the user with the received emitting status of each of the LEDs to determine if the emitting statuses are the same.

5. The method of claim 1, wherein the terminal triggering the wearable smart device to generate the emitting status for each of the LEDs further comprising:
   the terminal searching for wearable smart devices according to wireless communication protocols;
   the terminal generating and storing instruction messages, and transmitting the instruction messages to the designated wearable smart device, wherein the instruction messages comprise the emitting status of each of the LEDs of the designated wearable smart device; and
   the designated wearable smart device generating the emitting status for each of the LEDs according to the instruction messages.

6. The method of claim 5, wherein the terminal generating the emitting status for each of the LEDs randomly.

7. The method of claim 6, wherein the terminal comparing the emitting status of each of the LEDs inputted by the user with the stored emitting status of each of the LEDs to determine if the emitting statuses are the same.

8. The method, of claim 1, wherein the terminal triggering the designated wearable smart device to generate an emitting status for each of the LEDs comprises the terminal triggering the designated wearable smart device to generate an emitting status corresponding to the number of LEDs, wherein the emitting status indicates the number of emitting LEDs and/or non-emitting LEDs, and/or the locations of emitting LEDs and/or non-emitting LEDs.

9. The method of claim 1, wherein the communication connection established between the terminal and the wearable smart device is a blue-tooth connection.

10. A matching system between a wearable smart device and a terminal comprising a wearable smart device and a terminal;
    the wearable smart device is disposed with a plurality of LEDs, configured for generating an emitting status for each of the LEDs after being triggered by the terminal;
    the terminal is configured for triggering the wearable smart device to generate the emitting status for each of the LEDs, and for displaying an interactive interface for a user to input the emitting status of each of the LEDs, wherein when the emitting status of each of the LEDs inputted by the user is the same as the emitting status of each of the LEDs triggered by the terminal, a communication connection is established between the terminal and the designated wearable smart device, wherein the terminal is configured for triggering the designated wearable smart device to generate multiple sets of emitting statuses of LEDs,
    wherein each set of the emitting statuses of LEDs corresponds to the number of LEDs, and the multiple sets of emitting statuses of LEDs are generated according to chronological order, wherein each set of the emitting statuses of LEDs is the number of emitting LEDs and/or non-emitting LEDs, and/or the locations of emitting LEDs and/or non-emitting LEDs.

11. The system of claim 10, wherein the terminal comprises a first module and second module;

the first module being configured for searching for wearable smart devices according to wireless communication protocols;

the second module being configured for transmitting instruction messages to the designated wearable smart device such that the designated wearable smart device generates the emitting status for each of the LEDs; and the wearable smart device comprising a third module, the third module is generating the emitting status for each of the LEDs and transmitting the emitting status of each of the LEDs to the terminal.

12. The system of claim 11, wherein the third module of the wearable smart device is configured for generating the emitting status for each of the LEDs randomly, and transmitting the emitting status of each of the LEDs to the terminal.

13. The system of claim 12, wherein the terminal further comprises a fourth module, the fourth module being configured for comparing the emitting status of each of the LEDs inputted by the user with the received emitting status of each of the LEDs to determine if the emitting statuses are the same.

14. The system of claim 10, wherein the terminal comprises a fifth module and a sixth module;

the fifth module being configured for searching for wearable smart devices according to wireless communication protocols;

the sixth module being configured for generating and storing instruction messages, and for transmitting the instruction messages to the designated wearable smart device, wherein the instruction messages comprise the emitting status of each of the LEDs of the designated wearable smart device; and the designated wearable smart device comprising a seventh module, the seventh module being configured for generating the emitting status for each of the LEDs according to the instruction messages.

15. The system of claim 14, wherein the fifth module of the terminal is configured for generating the emitting status for each of the LEDs randomly.

16. The system of claim 15, wherein the terminal comprises a eighth module, the eighth module being configured for comparing the emitting status of each of the LEDs inputted by the user with the stored emitting status of each of the LEDs to determine if the emitting statuses are the same.

17. The system of claim 10, wherein the terminal is configured for triggering the designated wearable smart device to generate an emitting status corresponding to the number of LEDs, wherein the emitting status is the number of emitting LEDs and/or non-emitting LEDs, and/or the locations of emitting LEDs and/or non-emitting LEDs.

18. The system of claim 10, wherein the communication connection established between the terminal and the wearable smart device is a blue-tooth connection.

* * * * *